(12) United States Patent
Baek (10) Patent No.: US 12,286,120 B2
(45) Date of Patent: Apr. 29, 2025

(54) VEHICLE AND METHOD OF CONTROLLING A VEHICLE

(71) Applicants: HYUNDAI MOTOR COMPANY, Seoul (KR); KIA CORPORATION, Seoul (KR)

(72) Inventor: Jooam Baek, Gwangmyeong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 190 days.

(21) Appl. No.: 18/080,255

(22) Filed: Dec. 13, 2022

(65) Prior Publication Data

US 2023/0311896 A1 Oct. 5, 2023

(30) Foreign Application Priority Data

Mar. 30, 2022 (KR) .................... 10-2022-0039698

(51) Int. Cl.
*G06V 20/56* (2022.01)
*B60W 30/09* (2012.01)
(Continued)

(52) U.S. Cl.
CPC ............ *B60W 40/02* (2013.01); *B60W 30/09* (2013.01); *B60W 30/16* (2013.01); *G06V 20/56* (2022.01);
(Continued)

(58) Field of Classification Search
None
See application file for complete search history.

(56) References Cited

U.S. PATENT DOCUMENTS

| 10,372,128 B2* | 8/2019 | Myers ................... G01S 7/4808 |
| 2023/0003545 A1* | 1/2023 | Armenoff ............... G06T 17/00 |

FOREIGN PATENT DOCUMENTS

| DE | 102015207026 A1 * | 10/2016 |
| JP | H06162396 A * | 6/1994 |

(Continued)

OTHER PUBLICATIONS

Machine translation of Foltin (DE-102015207026-A1) (Year: 2016).*
(Continued)

*Primary Examiner* — Todd Melton
*Assistant Examiner* — Sarah A. Mueller
(74) *Attorney, Agent, or Firm* — Lempia Summerfield Katz LLC (57) ABSTRACT

A vehicle for preventing accidents when entering a tunnel includes: a front camera provided in the vehicle and configured to acquire front image data, a light wave detection and ranging (LiDAR) sensor provided in the vehicle and configured to acquire point cloud data, a front radar provided in the vehicle and configured to acquire front radar data, and a driver assist system including at least one of a cruise control system, an emergency braking control system, or a body control module. The vehicle further includes a controller that recognizes a tunnel positioned in front of the vehicle based on the front image data and the point cloud data, detects a preceding vehicle based on the front radar data, and controls an operation of the driver assist system based on the recognition of the tunnel in front of the vehicle and a relative speed between the preceding vehicle and the vehicle.

14 Claims, 6 Drawing Sheets

(51) Int. Cl.
  *B60W 30/16* (2020.01)
  *B60W 40/02* (2006.01)
(52) U.S. Cl.
  CPC . *B60W 2420/403* (2013.01); *B60W 2420/408* (2024.01); *B60W 2554/80* (2020.02); *B60W 2556/65* (2020.02)

(56) References Cited

FOREIGN PATENT DOCUMENTS

| | | | | |
|---|---|---|---|---|
| JP | 2020204842 | A | * | 12/2020 |
| JP | 2022022556 | A | * | 2/2022 |
| KR | 20160080269 | A | | 7/2016 |

OTHER PUBLICATIONS

Machine translation of Sugimoto (JP-H06162396-A) (Year: 1994).*
Machine translation of Tanaka et al. (JP-2020204842-A) (Year: 2020).*
Machine translation of Kaneko et al. (JP-2022022556-A) (Year: 2022).*

* cited by examiner

VEHICLE AND METHOD OF CONTROLLING A VEHICLE

CROSS-REFERENCE TO RELATED APPLICATION

This application claims the benefit of and priority to Korean Patent Application No. 10-2022-0039698, filed on Mar. 30, 2022 in the Korean Intellectual Property Office, the disclosure of which is incorporated herein by reference.

BACKGROUND

1. Field

Embodiments of the present disclosure relate to a vehicle and a method of controlling the vehicle, and more specifically, to a vehicle for preventing an accident when entering a tunnel and a method of controlling the vehicle.

2. Description of the Related Art

A tunnel refers to a vehicle traveling path formed by passing through a mountain, an underground (e.g., an underground tunnel), or the like.

When a vehicle enters such a tunnel, a driver may face a situation in which he or she may not be aware of a situation inside the tunnel due to sudden environmental changes. In addition, the inside of the tunnel is usually dark and poorly ventilated, thereby resulting in the driver's inattention.

Therefore, many traffic accidents occur inside the tunnel, and solutions for preventing the traffic accidents are desired.

Recently, research has been actively conducted an advanced driver assist system (ADAS) for a vehicle. The ADAS is configured to actively provide information on a vehicle state, a driver state, and surrounding environments to decrease the driver's burden and enhance the driver's convenience. In addition, research on autonomous traveling systems using the driver assist system is being actively conducted.

SUMMARY

The present disclosure provides a vehicle capable of preventing traffic accidents which may occur in a tunnel, and a method of controlling the vehicle.

Additional aspects of the disclosure are set forth in part in the description which follows and, in part, should be obvious from the description, or may be learned by practice of the present disclosure.

In accordance with one aspect of the present disclosure, a vehicle may include: a front camera provided in the vehicle and configured to acquire front image data, a light wave detection and ranging (LiDAR) sensor provided in the vehicle and configured to acquire point cloud data; a front radar provided in the vehicle and configured to acquire front radar data; and a driver assist system including at least one of a cruise control system, an emergency braking control system, or a body control module. The vehicle further includes a controller configured to recognize a tunnel positioned in front of the vehicle based on the front image data and the point cloud data, detect a preceding vehicle based on the front radar data, and control an operation of the driver assist system based on the recognition of the tunnel in front of the vehicle and a relative speed between the preceding vehicle and the vehicle when the relative speed is less than or equal to a preset speed.

In addition, the controller may perform a first operation of determining whether the tunnel is positioned in front of the vehicle 1 based on the front image data, perform a second operation of determining whether the tunnel is positioned in front of the vehicle based on the point cloud data, recognize the tunnel based on a determination that the tunnel is positioned in front of the vehicle in both the first operation and the second operation, and determine that the tunnel is not positioned in front of the vehicle based on a determination that the tunnel is not positioned in front of the vehicle in at least one of the first operation or the second operation.

In addition, the controller may perform the second operation based on the determination that the tunnel is positioned in front of the vehicle in the first operation.

In addition, the controller may determine in the first operation that the tunnel is positioned in front of the vehicle based on a difference between a pixel value in a preset first area and a pixel value in a preset second area exceeding a threshold.

In addition, the controller may determine in the second operation that the tunnel is positioned in front of the vehicle based on a change in speed of an object positioned in a preset third area that is not detected for a preset time.

In addition, the preset third area may include the preset first area and may not include the preset second area.

In addition, the controller may turn on at least one of the cruise control system or the emergency braking control system based on the recognition of the tunnel in front of the vehicle and the relative speed of the preceding vehicle that is lower than or equal to the preset speed.

In addition, the controller may control the body control module to operate a hazard lamp based on the recognition of the tunnel in front of the vehicle and the relative speed of the preceding vehicle that is lower than or equal to the preset speed.

In addition, the vehicle may further include a communicator configured to perform vehicle-to-vehicle communication with a following vehicle, and the controller may control the communicator to transmit a warning signal to the following vehicle based on the recognition of the tunnel in front of the vehicle and the relative speed of the preceding vehicle that is lower than or equal to the preset speed.

In addition, the vehicle may further include a navigation device configured to generate a traveling route based on position information of the vehicle, and the controller may receive the position information of the vehicle and information on the traveling route from the navigation device and recognize the tunnel based on presence of the tunnel on the traveling route and a distance between the vehicle and the tunnel that is smaller than or equal to a preset distance.

In accordance with another aspect of the present disclosure, a method of controlling a vehicle may include recognizing a tunnel positioned in front of the vehicle based on front image data acquired from a front camera and point cloud data acquired from a LiDAR sensor, detecting a preceding vehicle based on front radar data acquired from a front radar, and controlling an operation of a driver assist system including at least one of a cruise control system, an emergency braking control system, or a body control module based on the recognition of the tunnel in front of the vehicle and a relative speed between the preceding vehicle and the vehicle when the relative speed is less than or equal to a preset speed.

In addition, the recognizing of the tunnel may include performing a first operation of determining whether the tunnel is positioned in front of the vehicle based on the front image data, performing a second operation of determining whether the tunnel is positioned in front of the vehicle based on the point cloud data, recognizing the tunnel based on a determination that the tunnel is positioned in front of the vehicle in both the first operation and the second operation, and determining that the tunnel is not positioned in front of the vehicle based on a determination that the tunnel is not positioned in front of the vehicle in at least one of the first operation or the second operation.

In addition, the second operation may be performed based on the determination that the tunnel is positioned in front of the vehicle in the first operation.

In addition, the first operation may include determining that the tunnel is positioned in front of the vehicle based on a difference between a pixel value of a preset first area and a pixel value of a preset second area exceeding a threshold.

In addition, the second operation may include determining that the tunnel is positioned in front of the vehicle based on a change in speed of an object positioned in a preset third area that is not detected for a preset time.

In addition, the preset third area may include the preset first area and may not include the preset second area.

In addition, the controlling of the operation of the driver assist system may include turning on at least one of the cruise control system or the emergency braking control system based on the recognition of the tunnel in front of the vehicle and the relative speed of the preceding vehicle that is lower than or equal to the preset speed.

In addition, the controlling of the operation of the driver assist system may include controlling the body control module to operate a hazard lamp based on the recognition of the tunnel in front of the vehicle and the relative speed of the preceding vehicle that is lower than or equal to the preset speed.

In addition, the method may further include transmitting a warning signal to a following vehicle based on the recognition of the tunnel in front of the vehicle and the relative speed of the preceding vehicle that is lower than or equal to the preset speed.

In addition, the recognizing of the tunnel may include receiving position information of the vehicle and information on a traveling route from a navigation device, and recognizing the tunnel based on the presence of the tunnel on the traveling route and a distance between the vehicle and the tunnel that is smaller than or equal to a preset distance.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

Advantages and features of the disclosed present disclosure and an apparatus and method for achieving them should be made clear from embodiments described below with reference to the accompanying drawings. However, the disclosed present disclosure is not limited to the embodiments disclosed below but should be implemented in various different forms, and only the disclosed embodiments are provided so that the disclosure of the disclosed present disclosure should be thorough and complete and should fully convey the scope of the disclosed present disclosure to those having ordinary skill in the art to which the disclosed present disclosure pertains.

Terms used in the disclosed specification are briefly described, and the present disclosure is described below in detail.

The terms used in the disclosed present disclosure have been selected as currently widely used general terms as possible while considering the functions in the disclosed present disclosure, but this may vary depending on the intention of those skilled in the art, cases, the emergence of new technology, or the like. In addition, in a specific case, there is a term arbitrarily selected by the applicant, and in this case, the meaning is given in detail in the description of the corresponding disclosure. Therefore, the terms used in the disclosed present disclosure should be defined based on the meaning of the term and the contents throughout the disclosed present disclosure, rather than the name of a simple term.

Throughout the specification, when a certain portion is described as "including" a certain component, it means that other components may be further included rather than precluding other components unless otherwise stated. In addition, the term "unit" used in the specification refers to a hardware component such as software, a field programmable gate array (FPGA), or application specific integrated circuit (ASIC), and the "unit" performs certain roles. However, the "unit" is not meant to be limited to software or hardware. The "unit" may also be configured to reside on an addressable storage medium and may also be configured to reproduce one or more processors. Therefore, as one example, the "unit" refers to components such as software components, object-oriented software components, class components, and task components, processes, functions, attributes, procedures, subroutines, segments of program code, drivers, firmware, microcodes, circuits, data, databases, data structures, tables, arrays, and variables. The functionality provided within components and "units" may be coupled to be a smaller number of components and "units" or further divided into additional components and "units".

When a component, device, element, or the like of the present disclosure is described as having a purpose or performing an operation, function, or the like, the component, device, or element should be considered herein as being "configured to" meet that purpose or to perform that operation or function.

Hereinafter, embodiments of a vehicle and a method of controlling the vehicle are described in detail with reference to the accompanying drawings so as to be easily carried out by those having ordinary skill in the art to which the disclosed present disclosure pertains. In addition, in order to clearly describe the disclosure disclosed in the drawings, portions not related to the description have been omitted. In addition, in the drawings, the same reference numerals denote the same components, and overlapping descriptions thereof have been omitted.

Figure 1:
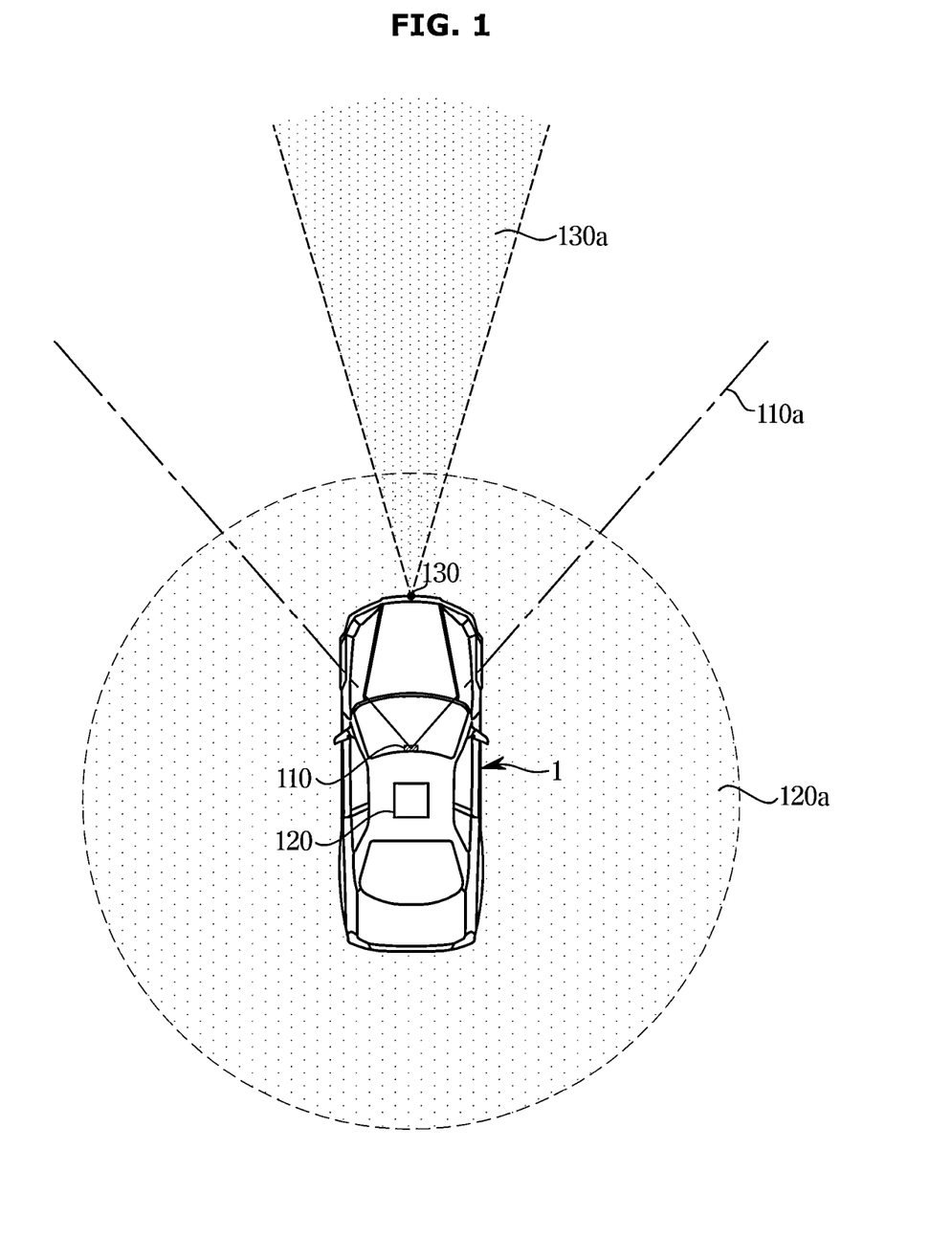
FIG. 1 shows sensors provided in a vehicle according to one embodiment.
Figure 2:
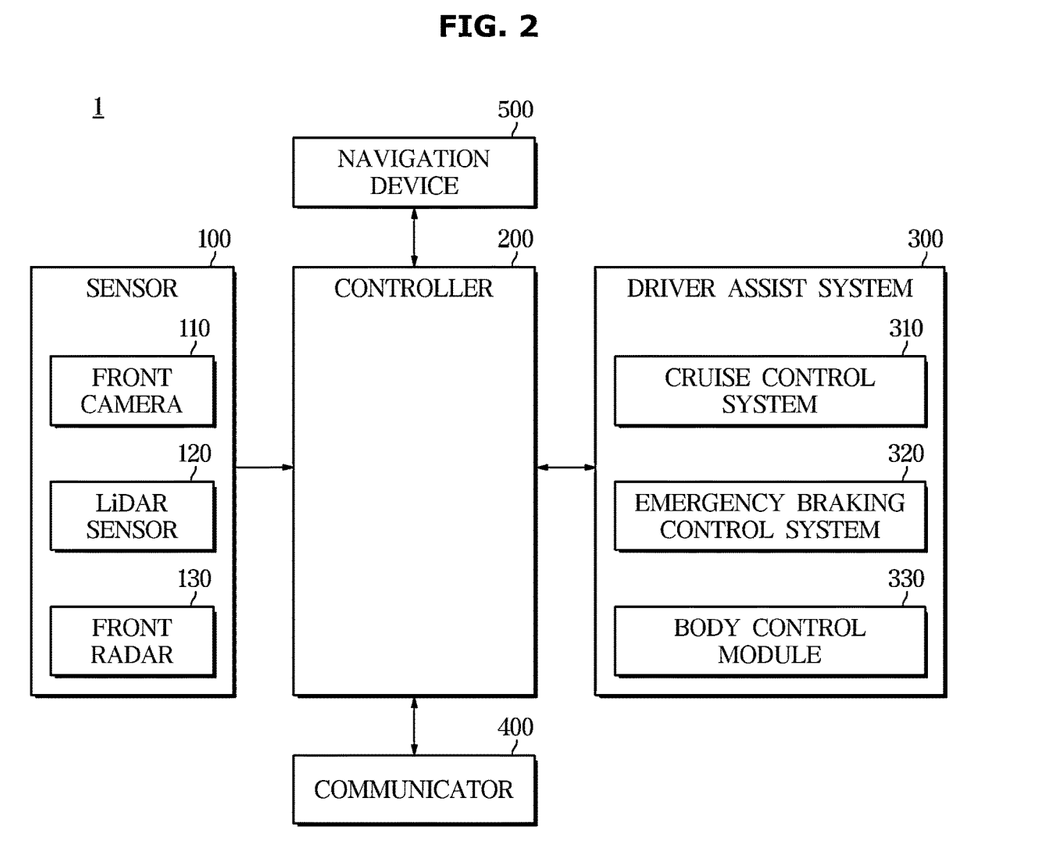
FIG. 2 shows a configuration of the vehicle according to one embodiment.

FIG. 1 shows sensors provided in a vehicle according to one embodiment, and FIG. 2 shows a configuration of the vehicle according to one embodiment.

Referring to FIGS. 1 and 2, a vehicle 1 according to one embodiment may include a sensor 100, a controller 200, a driver assist system 300, a communicator 400, and/or a navigation device 500.

The sensor 100 may include a front camera 110 configured to acquire image data in front of the vehicle 1, a light wave detection and ranging (LiDAR) sensor 120 configured to acquire point cloud data around the vehicle 1, and a front radar 130 configured to acquire front radar data in front of the vehicle 1.

The front camera 110 may have a field of view 110*a* in front of the vehicle 1. The front camera 110 may be provided, for example, on a front windshield of the vehicle 1, but provided at any position without limitation as long as it has a field of view in front of the vehicle 1.

The front camera 110 may capture a view in front of the vehicle 1 and acquire image data (hereinafter referred to as "front image data") in front of the vehicle 1.

The front image data may include a plurality of pixels and data on a plurality of pixel values corresponding to each of the plurality of pixels.

Positions of the plurality of pixels may be expressed as coordinate values, and the plurality of pixel values may be expressed as specific numbers.

The plurality of pixel values may refer to grayscale values. The grayscale value may be expressed as one of 0 to 255. A grayscale value closer to zero "0" refers to a darker pixel, and a grayscale value closer to 255 refers to a brighter pixel. In other words, the plurality of pixel values may refer to brightness values.

The front camera 110 may include a plurality of lenses and image sensors. The image sensor may include a plurality of photodiodes configured to convert light into an electrical signal, and the plurality of photodiodes may be arranged in a two-dimensional matrix.

The front camera 110 may be electrically connected to the controller 200. For example, the front camera 110 may be connected to the controller 200 through a vehicle communication network, connected to the controller 200 through a hard wire, or connected to the controller 200 through a printed circuit board (PCB).

The front camera 110 may transmit the front image data to the controller 200.

The LiDAR sensor 120 may acquire a relative position, a relative speed, and the like between the vehicle and a movable object (e.g., other vehicles, pedestrians, or cyclists) around the vehicle 1. In addition, the LiDAR sensor 120 may acquire a shape and position of a fixed object (e.g., an object around a tunnel) around the vehicle 1. The LiDAR sensor 120 may be installed in the vehicle 1 to have a field of view around the vehicle 1, and may acquire point cloud data for a field of view 120*a* around the vehicle 1.

For example, the LiDAR sensor 120 may be provided outside the vehicle 1 to have the field of view 120*a* around the vehicle 1, and more specifically, provided on a roof of the vehicle 1.

The LiDAR sensor 120 may include a light emitter configured to emit light, and a light receiver provided to receive light in a preset direction among reflected light when the light emitted from the light emitter is reflected from an obstacle. The LiDAR sensor 120 may further include a circuit board to which the light emitter and the light receiver are fixed. In one embodiment, a PCB is provided on a support plate rotated by a rotational drive unit and may be rotated 360 degrees clockwise or counterclockwise.

In other words, the support plate may rotate about an axis according to the power transmitted from the rotational drive unit, and the light emitter and the light receiver are fixed to the circuit board and provided to be rotated 360 degrees clockwise or counterclockwise together with the rotation of the circuit board. Therefore, the LiDAR sensor 120 may detect an object in a field of view 120*a* by emitting and receiving light at 360 degrees.

The light emitter is a component of emitting light (e.g., infrared laser), and a single light emitter or a plurality of light emitters may be provided according to embodiments.

When the light emitted from the light emitter is reflected from the obstacle, the light receiver is provided to receive light in a preset direction among the reflected light. An output signal generated by receiving light by the light receiver may be provided to the controller 200 for an object detection process.

The light receiver may include a condensing lens configured to condense the received light and an optical sensor configured to detect the received light. According to the embodiment, the light receiver may also include an amplifier configured to amplify the light detected by the optical sensor.

The LiDAR sensor 120 may receive data on numerous points on outer surfaces of the object, and acquire point cloud data, which is a set of data on these points.

The LiDAR sensor 120 may be electrically connected to the controller 200. For example, the LiDAR sensor 120 may be connected to the controller 200 through the vehicle communication network, connected to the controller 200 through the hard wire, or connected to the controller 200 through a PCB.

The LiDAR sensor 120 may transmit the point cloud data to the controller 200.

The front radar 130 may have a field of view 130*a* in front of the vehicle 1. The front radar 130 may be provided, for example, on a grille or a bumper of the vehicle 1, but provided at any position without limitation as long as it has the field of view 130*a* in front of the vehicle 1.

The front radar 130 may include a transmission antenna (or a transmission antenna array) configured to radiates a transmitted radio wave toward the front of the vehicle 1, and a reception antenna (or a reception antenna array) configured to receive a reflected radio wave reflected by the object. The front radar 130 may acquire front radar data from the transmitted radio wave transmitted by the transmission antenna and the reflected radio wave received by the reception antenna. The front radar data may include distance information and speed information on other vehicles, pedestrians, or cyclists, which are positioned in front of the vehicle 1. The front radar 130 may calculate a state distance to the object based on a phase difference (or a time difference) between the transmitted radio wave and the reflected radio wave and calculate the relative speed of the object based on a frequency difference between the transmitted radio wave and the reflected radio wave.

The front radar 130 may be connected to the controller 200 through, for example, a vehicle communication network, a hard wire, or a PCB. The front radar 130 may transmit radar data of an area in front of the vehicle 1 (hereinafter referred to as "front radar data") to the controller 200.

Although not shown in the drawings, it goes without saying that the sensor 100 may further include various sensors (e.g., a corner radar, a rear camera, and a side camera) configured to acquire environment information around the vehicle 1.

The driver assist system 300 may include at least one system and/or module configured to assist a driver.

For example, the driver assist system 300 may include at least one of a cruise control system 310, an emergency braking control system 320, or a body control module 330.

The cruise control system 310 may control the vehicle 1 to maintain a preset distance from a preceding vehicle based on the front radar data and/or the point cloud data and/or the front image data.

To this end, the cruise control system 310 may include the controller 200 and a separate electronic control unit (ECU).

In one embodiment, the cruise control system 310 may operate a braking system of the vehicle 1 when a distance from the vehicle 1 to the preceding vehicle is less than a preset distance. The cruise control system 310 may operate an acceleration system of the vehicle 1 when the distance to the preceding vehicle is greater than the preset distance or the speed of the vehicle 1 is lower than or equal to a preset speed.

The cruise control system 310 may be turned on or off based on a user input.

According to various embodiments, the cruise control system 310 may be turned on or off based on a control signal of the controller 200.

For example, the user may turn on or off a function of the cruise control system 310 through a user interface (e.g., a button) provided in the vehicle 1.

The emergency braking control system 320 may calculate a time to collision (TTC) with the preceding vehicle based on the front radar data and/or the point cloud data and/or the front image data and operate the braking system of the vehicle 1 to stop the vehicle 1 when the TTC is smaller than a preset time.

To this end, the emergency braking control system 320 may include the controller 200 and a separate ECU.

The emergency braking control system 320 may be turned on or off based on the user input.

For example, the user may turn on or off a function of the emergency braking control system 320 through the user interface (e.g., the button) provided in the vehicle 1.

According to various embodiments, the emergency braking control system 320 may be turned on or off based on the control signal of the controller 200.

The body control module 330 may control operations of electric components configured to provide convenience to the driver or ensure the driver's safety. For example, the body control module 330 may control a head lamp, a wiper, a cluster, a multi-function switch, a direction indicator lamp, and/or a hazard lamp.

According to various embodiments, the body control module 330 may control the operations of the above-described electric components based on the control signal received from the controller 200.

The driver assist system 300 may include, without limitation, any configuration for assisting the driver as well as the above-described configurations.

For example, the driver assist system 300 may further include a lane departure warning system, a lane following assist system, and/or an emergency steering control system.

The navigation device 500 may generate a traveling route based on position information of the vehicle 1.

To this end, the navigation device 500 may include a GPS sensor. The navigation device 500 may acquire the position information of the vehicle 1 through the GPS sensor and generate an expected traveling route of the vehicle 1 according to a change in the position of the vehicle 1.

In addition, the navigation device 500 may store map information. The map information may include, for example, information on a road on which the vehicle 1 travels, a terrain around the road, a structure (e.g., a tunnel), and/or a building.

The communicator 400 may include at least one communication module which may perform vehicle-to-vehicle communication (V2V communication).

The communicator 400 may share traveling data of the vehicle 1 with surrounding vehicles in real time through the V2V communication and transmit various information to the surrounding vehicles.

The controller 200 may control the driver assist system 300 and/or the communicator 400 based on data received from the sensor 100 and/or data received from the navigation device 500.

The controller 200 may include at least one memory in which a program for performing the above-described operation and an operation to be described below is stored and at least one processor configured to execute the stored program.

Although shown separately in the drawings, the controller 200 may include an ECU included in each of the driver assist system 300.

The controller 200 may recognize a tunnel positioned in front of the vehicle 1 based on the data received from the sensor 100 and control the operation of the driver assist system 300 based on the recognition of the tunnel in front of the vehicle 1.

To this end, the at least one memory may store a program and/or data for processing the data received from the sensor 100.

The at least one processor may include an image processor configured to process the front image data and/or a digital signal processor configured to process the point cloud data and/or a processor configured to generate a control signal for controlling the driver assist system 300.

The at least one memory may temporarily store the front image data received from the front camera 110 and/or the front radar data received from the front radar 130 and/or the point cloud data received from the LiDAR sensor 120. The memory may temporarily store processed results of the front image data and/or the front radar data and/or the point cloud data of the processor.

In an embodiment, the memory may include not only volatile memories such as a static random access memory (SRAM) and a dynamic RAM (DRAM) but also non-volatile memories such as a flash memory, a read only memory (ROM), and an erasable programmable read only memory (EPROM).

When the controller 200 includes a plurality of memories and a plurality of processors, the plurality of memories and the plurality of processors may also be integrated into one chip or may also be physically separated.

The sensor 100, the driver assist system 300, the navigation device 500 and/or the communicator 400, and the controller 200 may communicate with one another through the vehicle communication network. For example, the components may transmit or receive data through an Ethernet, a media oriented systems transport (MOST), Flexray, a controller area network (CAN), a local interconnect network (LIN), and the like.

FIG. 2 shows that the sensor 100, the driver assist system 300, the navigation device 500 and/or the communicator 400, and the controller 200 are separate components, but this may be only a functional separation of one configuration.

For example, the controller 200 may include at least one processor and at least one memory of the driver assist system 300 and/or the navigation device 500. The controller 200 may be in an integrated controller to control the driver assist system 300 and the navigation device 500.

Various components of the vehicle 1 have been described above, but a new configuration may be added or the described configuration may be omitted within the general technical scope.

Figure 3:
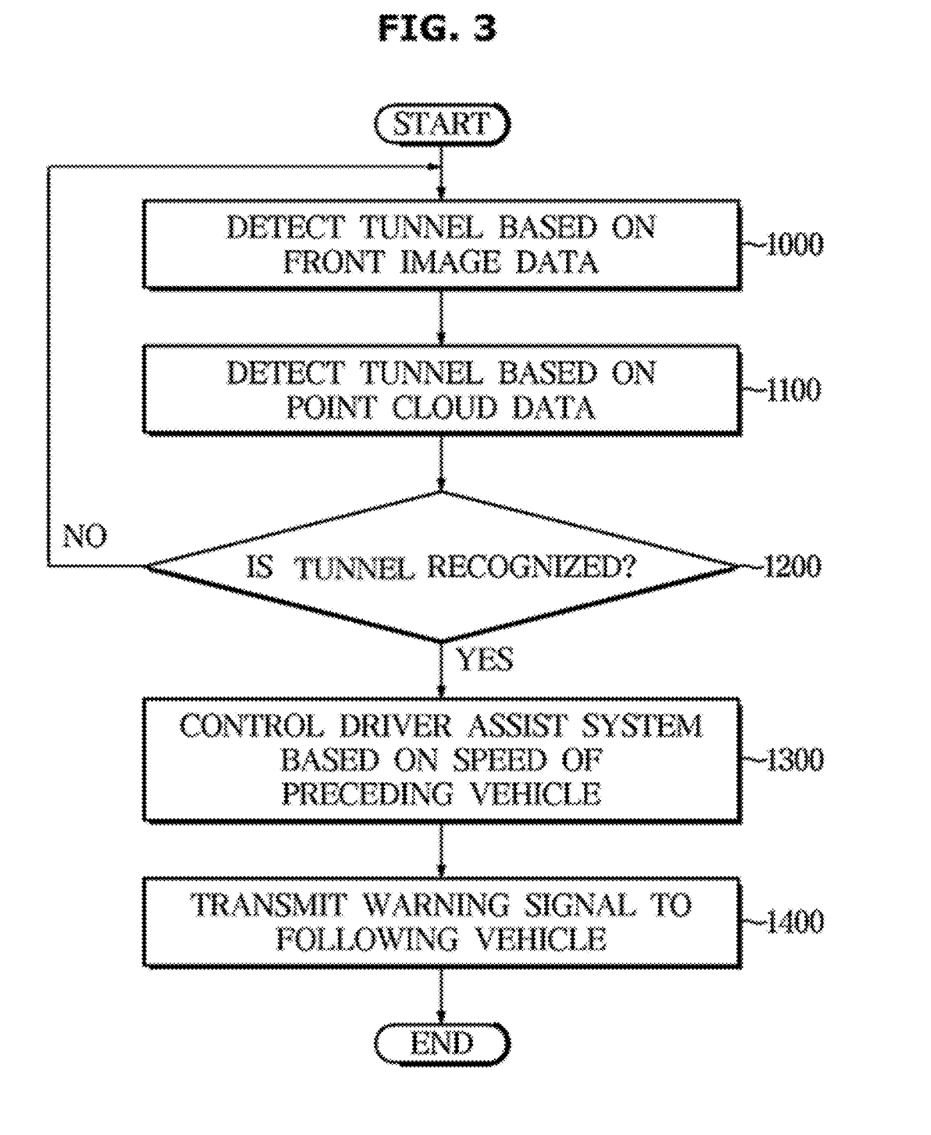
FIG. 3 is a flowchart illustrating a method of controlling the vehicle according to one embodiment.

FIG. 3 is a flowchart illustrating a method of controlling the vehicle according to one embodiment.

Referring to FIG. 3, the controller 200 may receive the front image data from the front camera 110, receive the point cloud data from the LiDAR sensor 120, and receive the front radar data from the front radar 130.

The controller 200 may recognize a tunnel positioned in front of the vehicle 1 based on the front image data and the point cloud data.

In one embodiment, the controller 200 may perform a process of determining whether the tunnel is positioned in front of the vehicle 1 based on the front image data (hereinafter referred to as a "first operation") (1000).

In the first operation 1000, the controller 200 may determine that the tunnel is positioned in front of the vehicle 1 based on a difference between a pixel value of a preset first area A1 of the front image data and a pixel value of a preset second area A2 of the front image data exceeding a threshold.

Figure 4:
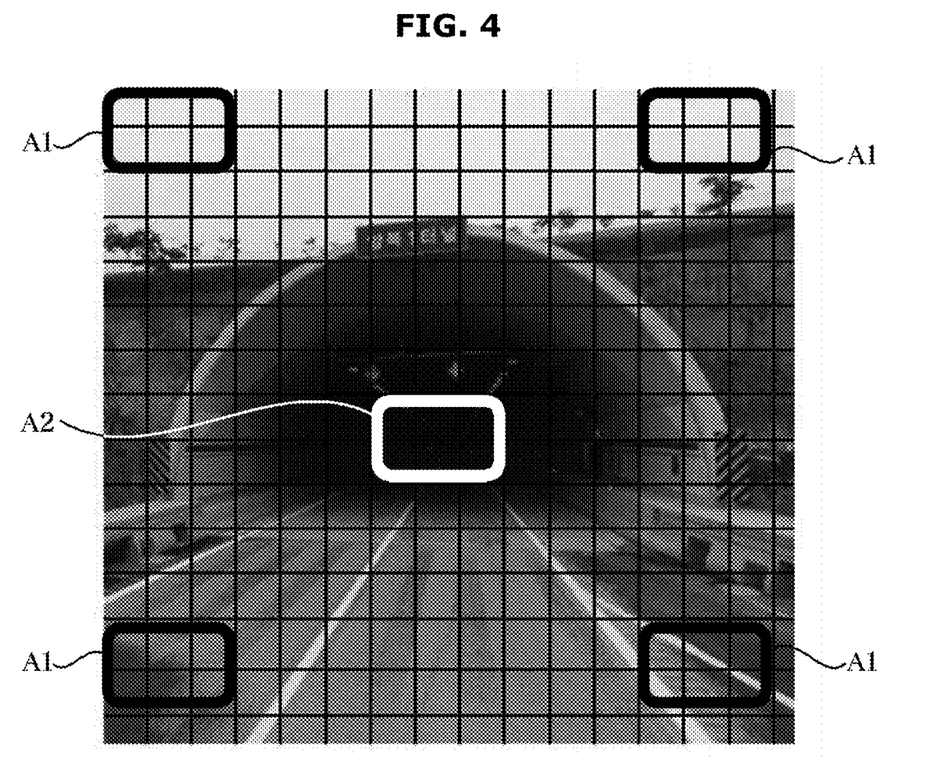
FIG. 4 shows an example of front image data acquired through a front camera of the vehicle according to one embodiment.
Figure 5:
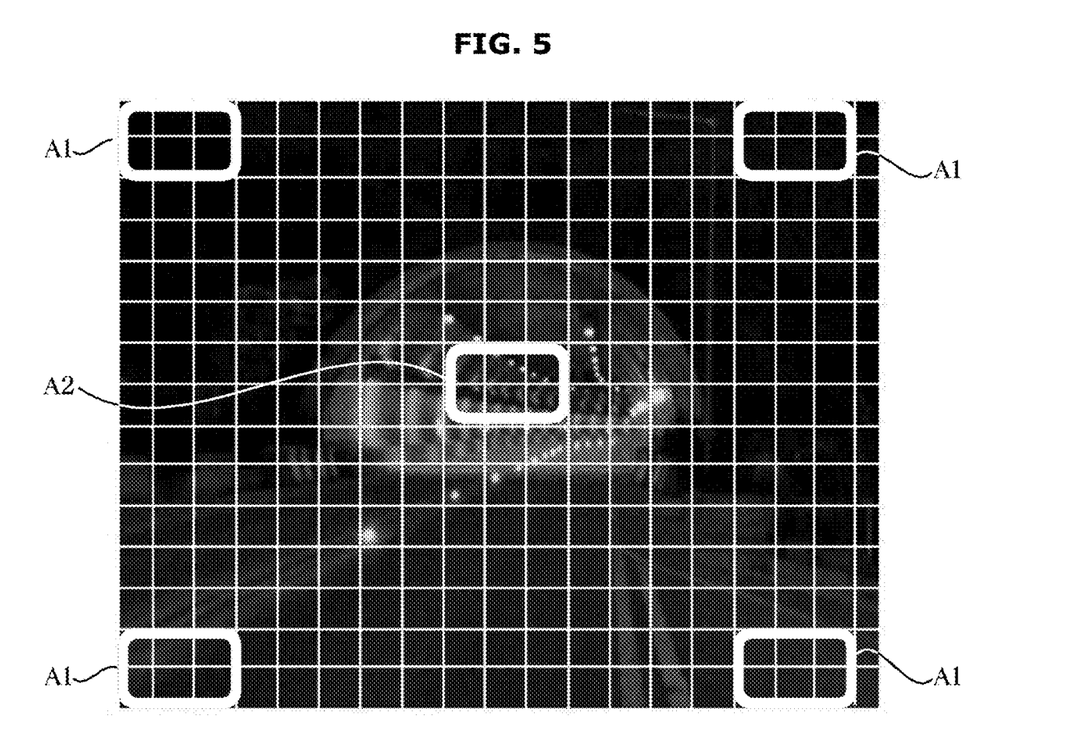
FIG. 5 shows another example of the front image data acquired through the front camera of the vehicle according to one embodiment.

FIG. 4 shows an example of the front image data acquired in daytime through the front camera of the vehicle according to one embodiment, and FIG. 5 shows another example of the front image data acquired at night through the front camera of the vehicle according to one embodiment.

Referring to FIGS. 4 and 5, the preset first area A1 may include areas of corner portions (upper left corner, upper right corner, lower left corner, and lower right corner) of the front image, and the preset second area A2 may include an area in the middle of the front image.

Data on positions of the plurality of pixels for defining the preset first area A1 and/or the preset second area A2 of the front image data may be stored in the memory.

The pixel value of the preset first area A1 may refer to an average value of pixel values of at least one pixel included in the preset first area A1.

In addition, the pixel value of the preset second area A2 may refer to an average value of pixel values of at least one pixel included in the preset second area A2.

Referring to FIG. 4, in the daytime when the sun is up, when the tunnel is positioned in front of the vehicle 1, pixels corresponding to the preset first area A1 have relatively large pixel values and pixels corresponding to the preset second area A2 have relatively small pixel values.

Accordingly, in the daytime when the sun is up, when the tunnel is positioned in front of the vehicle 1, the difference between the pixel value of the preset first area A1 and the pixel value of the preset second area A2 may exceed the threshold.

Likewise, referring to FIG. 5, at night when the sun sets, when the tunnel is positioned in front of the vehicle 1, the pixels corresponding to the preset first area A1 have relatively small pixel values, and the pixels corresponding to the preset second area A2 have relatively large pixel values.

Therefore, when the tunnel is positioned in front of the vehicle 1 at night when the sun sets, the difference between the pixel value of the preset first area A1 and the pixel value of the preset second area A2 may exceed the threshold.

The memory may store the threshold for determining whether the tunnel is present based on the difference between the pixel values. The threshold may be set to about 150 based on the pixel value, but may be changed according to various criteria.

In other words, when the tunnel is positioned in front of the vehicle 1, the difference between the pixel value of the preset first area A1 and the pixel value of the preset second area A2 may exceed the threshold. The controller 200 may determine whether the tunnel is positioned in front of the vehicle 1 based on whether the difference between the pixel value of the preset first area A1 and the pixel value of the preset second area A2 exceeds the threshold.

Meanwhile, even when the tunnel is not positioned in front of the vehicle 1, the difference between the pixel value of the preset first area A1 and the pixel value of the preset second area A2 may exceed the threshold according to various environmental factors.

Therefore, when the tunnel is recognized based on only the front image data, a recognition rate may be decreased.

The controller 200 according to one embodiment may perform a process of determining whether the tunnel is positioned in front of the vehicle 1 based on the point cloud data (hereinafter referred to as a "second process") (1100).

In the second operation 1100, the controller 200 may determine that the tunnel is positioned in front of the vehicle 1 based on a change in the speed of the object positioned in a preset third area A3 of the point cloud data that is not detected for a preset time.

Figure 6:
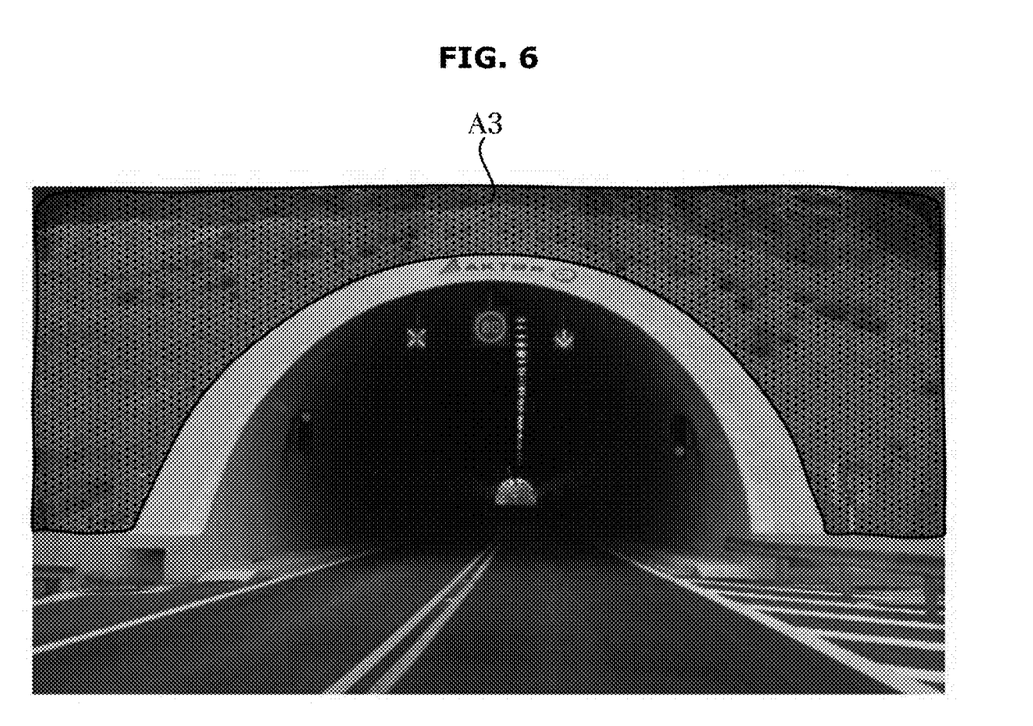
FIG. 6 shows one example of an area detected by a LiDAR sensor of the vehicle according to one embodiment.

FIG. 6 shows one example of an area detected by a LiDAR sensor of the vehicle according to one embodiment.

Referring to FIG. 6, the preset third area A3 may include areas of upper left, upper middle, and upper right portions of the vehicle 1.

Data for defining the preset third area A3 of the point cloud data may be stored in the memory.

In addition, the preset time is a period for securing reliability which may estimate that the object positioned in the preset third area A3 is the fixed object and may be set to about one second but the present disclosure is not limited thereto.

The LiDAR sensor 120 may detect objects in a field of view 120a by emitting and receiving light at 360 degrees. In addition, when the LiDAR sensor 120 includes a plurality of light emitters, three-dimensional point cloud data may be acquired.

Therefore, a criterion for defining the preset third area A3 of the point cloud data may be defined by a direction in which the light receiver receives light, and the direction in which the light receiver receives light may be defined by a rotational angle of the light emitter.

The preset first area A1 and the preset second area A2 of the front image data and the preset third area A3 of the point cloud data may have the correlation with one another.

For example, the preset third area A3 of the point cloud data may include the preset first area A1 of the front image data.

In other words, the preset third area A3 of the point cloud data may be an area corresponding to pixels in the upper left corner portion and pixels in the upper right corner portion based on the front image data.

On the other hand, the preset third area A3 of the point cloud data may not include the preset second area A2 of the front image data.

In other words, the preset third area A3 of the point cloud data may not correspond to pixels in the central area based on the front image data.

The controller 200 may detect a change in the speed of the object based on the point cloud data received from the LiDAR sensor 120.

Referring to FIG. 6, when the tunnel is positioned in front of the vehicle 1, the object corresponding to the preset third area A3 may be a structure forming the tunnel or a geographic feature (e.g., mountain) which is a target in which the tunnel is formed.

In other words, when the tunnel is positioned in front of the vehicle 1, the object corresponding to the preset third area A3 may be the fixed object.

Therefore, when the tunnel is positioned in front of the vehicle 1, the change in the speed of the object detected in the preset third area A3 may not be detected for a preset time.

In one embodiment, the controller 200 may recognize the tunnel based on a determination that the tunnel is positioned in front of the vehicle 1 in both the first operation 1000 and the second operation 1100 (1200).

In other words, the controller 200 may recognize the tunnel in front of the vehicle 1 when the difference between the pixel value of the preset first area A1 and the pixel value of the preset second area A2 of the front image data exceeds the threshold and the change in the speed of the object positioned in the preset third area A3 of the point cloud data is not detected for the preset time.

In other words, even when it is determined that the tunnel is positioned in front of the vehicle 1 according to the front image data, the controller 200 may not recognize the tunnel when it is not determined that the tunnel is positioned in front of the vehicle 1 according to the point cloud data.

In addition, even when it is determined that the tunnel is positioned in front of the vehicle 1 according to the point cloud data, the controller 200 may not recognize the tunnel when it is not determined that the tunnel is positioned in front of the vehicle 1 according to the front image data.

According to the present disclosure, it is possible to improve the recognition rate by additionally recognizing the tunnel based on the point cloud data instead of recognizing the tunnel based on only the front image data.

According to various embodiments, the controller 200 may perform the second operation 1100 based on the determination that the tunnel is positioned in front of the vehicle 1 in the first operation 1000.

In other words, only when it is determined that the tunnel is positioned in front of the vehicle 1 as a result of processing the front image data, the controller 200 may process the point cloud data to determine whether the tunnel is positioned in front of the vehicle 1.

According to the present disclosure, it is possible to decrease the data processing amount of the processor by performing the second operation according to the data processed result of the first operation in which logic for processing data is relatively simple.

When the tunnel is recognized in front of the vehicle 1 (Yes in 1200), the controller 200 may control the operation of the driver assist system 300 based on a speed of a preceding vehicle (1300).

The controller 200 may detect the preceding vehicle based on the processing of the radar data. Specifically, the controller 200 may detect a relative speed of the preceding vehicle with respect to the vehicle 1.

According to various embodiments, the preceding vehicle may refer to a vehicle having a distance from the vehicle 1 within a preset distance among vehicles which are traveling in front of the vehicle 1.

In this case, the preset distance may be changed depending on circumstances. For example, the preset distance may be set larger as the speed of the vehicle 1 increases.

In a narrower range, the preceding vehicle may refer to a vehicle which is traveling in the same lane as the vehicle 1.

The controller 200 may control the operation of the driver assist system 300 based on the recognition of the tunnel in front of the vehicle 1 (Yes in 1200) and the relative speed of the preceding vehicle that is lower than or equal to a preset speed.

In this case, the preset speed may have a negative value. For example, the preset speed may be set to about −10 km/h.

In other words, when the tunnel is recognized in front of the vehicle 1 and the speed of the vehicle 1 is higher than the speed of the preceding vehicle, the controller 200 may operate the driver assist system 300 to prevent traffic accidents.

For example, the controller 200 may turn on at least one of the cruise control system 310 or the emergency braking control system 320 based on the recognition of the tunnel in front of the vehicle 1 and the relative speed between the vehicle and the preceding vehicle when the relative speed is less than or equal to the preset speed.

According to the present disclosure, it is possible to prevent the traffic accidents due to the change in the environment by the tunnel by automatically activating the function of the cruise control system 310 and/or the function of the emergency braking control system 320 when the tunnel is recognized in front of the vehicle 1 even when the user deactivates the function of the cruise control system 310 and the function of the emergency braking control system 320 through the user interface.

As described above, the cruise control system 310 operates the braking system of the vehicle 1 based on the distance from the preceding vehicle that is closer than the preset distance. In this case, the preset distance may be set by the user.

In one embodiment, the controller 200 may set the preset distance to a maximum settable distance when the tunnel is recognized in front of the vehicle 1 and the cruise control system 310 is turned on based on the relative speed of the preceding vehicle that is lower than or equal to the preset speed.

According to the present disclosure, it is possible to prevent the traffic accidents by maintaining an inter-vehicle distance even when the preceding vehicle suddenly stops inside the tunnel because the cruise control system 310 in which the preset distance is set to the maximum settable distance is activated.

In addition, when the cruise control system 310 is automatically turned on by the controller 200, a condition for turning off the cruise control system 310 may be changed.

Specifically, the cruise control system 310 may be turned off when the driver steps on the brake pedal or operates a separate input device, but when the cruise control system 310 is automatically turned on by the controller 200, the cruise control system 310 may not be turned off even when the driver steps on the brake pedal.

According to the present disclosure, it is possible to prevent the function of the cruise control system 310 from being automatically turned off by the driver's unintentional operation of the brake when the function of the cruise control system 310 is automatically turned on to prevent the accidents when the vehicle enters the tunnel.

In addition, as described above, the emergency braking control system 320 may operate the braking system of the vehicle 1 to stop the vehicle 1 when the time to collision with the preceding vehicle is smaller than the preset time.

In one embodiment, when turning on the emergency braking control system 320 based on the recognition of the tunnel in front of the vehicle 1 and the relative speed of the preceding vehicle that is lower than or equal to the preset speed, the controller 200 may increase the preset time.

In other words, when the tunnel is recognized in front of the vehicle 1 and the relative speed of the preceding vehicle is lower than or equal to the preset speed, the controller 200 may improve the sensitivity of the emergency braking control system 320.

According to the present disclosure, it is possible to prevent the accidents by operating the emergency braking control system 320 even when the preceding vehicle suddenly stops inside the tunnel because the emergency braking control system 320 in which the sensitivity is set highly is activated.

In one embodiment, the controller 200 may control the body control module 330 to operate a hazard lamp based on the recognition of the tunnel in front of the vehicle 1 and the relative speed of the preceding vehicle that is lower than or equal to the preset speed.

According to the present disclosure, it is possible to prevent the collision with the following vehicle by providing a visual warning to the following vehicle following the vehicle 1 when the vehicle 1 entering the tunnel is faster than the preceding vehicle having entered the tunnel.

According to various embodiments, the controller 200 may control the communicator 400 to transmit a warning signal to the following vehicle based on the recognition of the tunnel in front of the vehicle 1 and the relative speed of the preceding vehicle that is lower than or equal to the preset speed (1400).

In this case, the warning signal may include a control signal for operating the hazard lamp and/or a control signal for turning on the emergency braking control system 320 and/or a control signal for turning on the cruise control system 310.

In other words, the following vehicle may operate the hazard lamp, turn on the emergency braking control system 320, or turn on the cruise control system 310 based on the reception of the warning signal.

According to the present disclosure, it is possible to prevent the collision with the following vehicle by transmitting the warning signal to the following vehicle using the V2V communication.

Meanwhile, according to various embodiments, the controller 200 may receive the position information of the vehicle 1 and the information on the traveling route from the navigation device 500 and recognize that the tunnel is positioned in front of the vehicle 1 when the tunnel is present on the traveling route and the distance between the vehicle 1 and the tunnel is smaller than or equal to the preset distance.

Therefore, the controller 200 may operate the driver assist system 300 as described above based on the recognition of the tunnel according to the information received from the navigation device 500 and the relative speed of the preceding vehicle that is lower than or equal to the preset speed.

However, when the tunnel is not recognized using the navigation device 500, there may be disadvantages in that it is not possible to flexibly cope with a communication impossibility situation and it is not possible to recognize the type of tunnel such as an indoor access road (e.g., a parking ramp).

According to various embodiments, before the controller 200 turns on the cruise control system 310 and/or the emergency braking control system 320 according to the operation 1300, when the function of the cruise control system 310 and/or the function of the emergency braking control system 320 are inactivated by the user's setting, the controller 200 may turn off the cruise control system 310 and/or the emergency braking control system 320 based on the lapse of the preset time after the vehicle 1 exits the tunnel.

When the vehicle 1 exits the tunnel, the difference between the pixel values of the pixels of the corner portion of the front image data and the pixel values of the pixels of the central portion of the front image data is significant as in the case of entering the tunnel.

Specifically, when the vehicle 1 exits the tunnel in the daytime, the pixel values of the central portion are relatively large and the pixel values of the corner portion are relatively small.

Conversely, when the vehicle 1 exits the tunnel at night, the pixel values of the central portion are relatively small and the pixel values of the corner portion are relatively large.

Therefore, the controller 200 may determine whether the vehicle 1 has exited the tunnel based on the first operation 1000.

According to various embodiments, the controller 200 may also determine whether the vehicle 1 exits the tunnel based on the position information of the vehicle 1 received from the navigation device 500.

According to the present disclosure, it is possible to accurately recognize the tunnel positioned in front of the vehicle 1 using the point cloud data as well as the front image data.

In addition, according to the present disclosure, it is possible to prevent the accidents due to the environmental changes when the vehicle 1 enters the tunnel by operating the driver assist system 300 according to the relative speed with the preceding vehicle when the tunnel is recognized.

Meanwhile, some components of the vehicle 1 may be software and/or hardware components such as a FPGA and an ASIC.

Meanwhile, the disclosed embodiments may be implemented in the form of a recording medium configured to store instructions executable by a computer. The instructions may be stored in the form of program code, and may generate program modules to perform the operations of the disclosed embodiments when executed by a processor. The recording medium may be implemented as a computer-readable recording medium.

Computer-readable recording media includes all types of recording media in which the instructions readable by the computer are stored. For example, there may be ROMs, RAMs, magnetic tapes, magnetic disks, flash memories, optical data storage devices, and the like.

According to the present disclosure, it is possible to improve a tunnel recognition rate by adopting various sensors to recognize a tunnel.

According to the present disclosure, it is possible to prevent traffic accidents which may occur in a tunnel by controlling an operation of a driver assist system when a vehicle enters the tunnel.

According to the present disclosure, it is possible to prevent a collision with a following vehicle at the same time as preventing a collision with a preceding vehicle when a vehicle enters a tunnel.

The disclosed embodiments have been described above with reference to the accompanying drawings. Those having ordinary skill in the art to which the present disclosure pertains should understand that the present disclosure may be practiced in other forms than the disclosed embodiments even without changing the technical spirit or essential features of the present disclosure. The disclosed embodiments are illustrative and should not be construed as being restrictive.

What is claimed is:

1. A vehicle comprising:
    a front camera provided in the vehicle and configured to acquire front image data;
    a light wave detection and ranging (LiDAR) sensor provided in the vehicle and configured to acquire point cloud data;
    a front radar provided in the vehicle and configured to acquire front radar data;
    a driver assist system including at least one of a cruise control system, an emergency braking control system, or a body control module; and
    a controller configured to:
        recognize a tunnel positioned in front of the vehicle based on the front image data and the point cloud data,
        detect a preceding vehicle based on the front radar data, and
        in response to the tunnel in front of the vehicle being recognized and a relative speed between the preceding vehicle and the vehicle being less than or equal to a preset speed, control an operation of the driver assist system,
    wherein the controller is further configured to:
        perform a first operation of determining whether the tunnel is positioned in front of the vehicle based on the front image data;
        perform a second operation of determining whether the tunnel is positioned in front of the vehicle based on the point cloud data;
        recognize the tunnel based on a determination that the tunnel is positioned in front of the vehicle in both the first operation and the second operation; and
        determine that the tunnel is not positioned in front of the vehicle based on a determination that the tunnel is not positioned in front of the vehicle in at least one of the first operation or the second operation,
    wherein in the first operation, the controller is configured to determine that the tunnel is positioned in front of the vehicle based on a difference between a pixel value in a preset first area and a pixel value in a preset second area exceeding a threshold,
    wherein in the second operation, the controller is configured to determine that the tunnel is positioned in front of the vehicle based on a change in speed of an object positioned in a preset third area of the cloud data, and wherein the change in speed of the object in the preset third area is not detected over a preset interval time.

2. The vehicle of claim 1, wherein the controller is configured to perform the second operation based on the determination that the tunnel is positioned in front of the vehicle in the first operation.

3. The vehicle of claim 1, wherein the preset third area includes the preset first area and does not include the preset second area.

4. The vehicle of claim 1, wherein the controller is configured to turn on at least one of the cruise control system or the emergency braking control system based on the tunnel in front of the vehicle being recognized and the relative speed of the preceding vehicle being less than or equal to the preset speed.

5. The vehicle of claim 1, wherein the controller is configured to control the body control module to operate a hazard lamp based on the tunnel in front of the vehicle being recognized and the relative speed of the preceding vehicle being less than or equal to the preset speed.

6. The vehicle of claim 1, further comprising a communicator configured to perform vehicle-to-vehicle communication with a following vehicle,
    wherein the controller is further configured to control the communicator to transmit a warning signal to the following vehicle based on the tunnel in front of the vehicle being recognized and the relative speed of the preceding vehicle being less than or equal to the preset speed.

7. The vehicle of claim 1, further comprising a navigation device configured to generate a traveling route based on position information of the vehicle,
    wherein the controller is configured to receive the position information of the vehicle and information on the traveling route from the navigation device, and recognize the tunnel based on the tunnel being present on the traveling route and a distance between the vehicle and the tunnel being less than or equal to a preset distance.

8. A method of controlling a vehicle, comprising:
    recognizing a tunnel positioned in front of the vehicle based on front image data acquired from a front camera and point cloud data acquired from a light wave detection and ranging (LiDAR) sensor;
    detecting a preceding vehicle based on front radar data acquired from a front radar; and
    in response to the tunnel in front of the vehicle being recognized and a relative speed between the preceding vehicle and the vehicle being less than or equal to a preset speed, controlling an operation of a driver assist system including at least one of a cruise control system, an emergency braking control system, or a body control module,
    wherein recognizing the tunnel includes:
        performing a first operation of determining whether the tunnel is positioned in front of the vehicle based on the front image data;
        performing a second operation of determining whether the tunnel is positioned in front of the vehicle based on the point cloud data;
        recognizing the tunnel based on a determination that the tunnel is positioned in front of the vehicle in both the first operation and the second operation; and
        determining that the tunnel is not positioned in front of the vehicle based on a determination that the tunnel is not positioned in front of the vehicle in at least one of the first operation or the second operation,
    wherein the first operation includes determining that the tunnel is positioned in front of the vehicle based on a difference between a pixel value of a preset first area and a pixel value of a preset second area exceeding a threshold,
    wherein the second operation includes determining that the tunnel is positioned in front of the vehicle based on a change in speed of an object positioned in a preset third area of the cloud data, and wherein the change in speed of the object in the preset third area is not detected over a preset interval time.

9. The method of claim 8, wherein the second operation is performed based on the determination that the tunnel is positioned in front of the vehicle in the first operation.

10. The method of claim 8, wherein the preset third area includes the preset first area and does not include the preset second area.

11. The method of claim 8, wherein controlling the operation of the driver assist system includes turning on at least one of the cruise control system or the emergency braking control system based on the tunnel in front of the vehicle being recognized and the relative speed of the preceding vehicle being less than or equal to the preset speed.

12. The method of claim 8, wherein controlling the operation of the driver assist system includes controlling the body control module to operate an a hazard lamp based on the tunnel in front of the vehicle being recognized and the relative speed of the preceding vehicle being less than or equal to the preset speed.

13. The method of claim 8, further comprising transmitting a warning signal to a following vehicle based on the tunnel in front of the vehicle being recognized and the relative speed of the preceding vehicle being less than or equal to the preset speed.

14. The method of claim 8, wherein recognizing the tunnel includes:
   receiving position information of the vehicle and information on a traveling route from a navigation device; and
   recognizing the tunnel based on the tunnel being present on the traveling route and a distance between the vehicle and the tunnel being less than or equal to a preset distance.

* * * * *